United States Patent
Kinoshita et al.

(10) Patent No.: US 10,857,671 B2
(45) Date of Patent: *Dec. 8, 2020

(54) ROBOT

(71) Applicant: KABUSHIKI KAISHA YASKAWA DENKI, Kitakyushu (JP)

(72) Inventors: Yusuke Kinoshita, Kitakyushu (JP); Eiji Fujitsu, Kitakyushu (JP); Kazuyoshi Nogami, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 311 days.

This patent is subject to a terminal disclaimer.

(21) Appl. No.: 15/954,544

(22) Filed: Apr. 16, 2018

(65) Prior Publication Data

US 2018/0229362 A1 Aug. 16, 2018

Related U.S. Application Data

(63) Continuation of application No. 15/052,884, filed on Feb. 25, 2016, now Pat. No. 9,975,239.

(30) Foreign Application Priority Data

Mar. 2, 2015 (JP) ................................ 2015-040613

(51) Int. Cl.
*B25J 9/12* (2006.01)
*B25J 9/04* (2006.01)
(Continued)

(52) U.S. Cl.
CPC ................ *B25J 9/12* (2013.01); *B23K 37/02* (2013.01); *B25J 9/0024* (2013.01); *B25J 9/0027* (2013.01);
(Continued)

(58) Field of Classification Search
CPC . B25J 9/12; B25J 18/005; B25J 11/005; B25J 9/0027; B25J 9/0024; B25J 19/0025;
(Continued)

(56) References Cited

U.S. PATENT DOCUMENTS

| 4,221,997 A | 9/1980 | Flemming |
| D267,883 S | 2/1983 | Susnjara |

(Continued)

FOREIGN PATENT DOCUMENTS

| CN | 101980837 | 2/2011 |
| CN | 102463571 | 5/2012 |

(Continued)

OTHER PUBLICATIONS

European Patent Office Communication for corresponding EP Application No. 16158158.2-1018, dated Jul. 18, 2018.
(Continued)

*Primary Examiner* — Victor L MacArthur
(74) *Attorney, Agent, or Firm* — Mori & Ward, LLP (57) ABSTRACT

A robot includes a first arm rotatable around a first axis, a second arm connected to the first arm at a second axis which is parallel to the first axis and around which the second arm is rotatable, a third arm connected to the second arm at a third axis which is parallel to the first axis and around which the third arm is rotatable, a distal-end swingable portion rotatably connected to the third arm, a distal end rotatably connected to the distal-end swingable portion, a fourth actuator configured to rotate the distal-end swingable portion and including a first motor having a first motor rotation axis, and a fifth actuator configured to rotate the distal end and including a second motor having a second motor rotation axis that is parallel to the first motor rotation axis.

15 Claims, 6 Drawing Sheets

(51) Int. Cl.
*B25J 15/00* (2006.01)
*B25J 19/00* (2006.01)
*B25J 9/00* (2006.01)
*B25J 18/00* (2006.01)
*B23K 37/02* (2006.01)
*B25J 11/00* (2006.01)

(52) U.S. Cl.
CPC .............. *B25J 9/046* (2013.01); *B25J 9/126* (2013.01); *B25J 11/005* (2013.01); *B25J 15/0019* (2013.01); *B25J 18/005* (2013.01); *B25J 19/0025* (2013.01); *B25J 18/007* (2013.01); *Y10S 901/27* (2013.01); *Y10S 901/42* (2013.01)

(58) Field of Classification Search
CPC ........ B25J 15/0019; B25J 9/126; B25J 9/046; B25J 18/007; B25J 9/00; B23K 37/02; B23K 37/0252; Y10S 901/42; Y10S 901/27
See application file for complete search history.

(56) References Cited

U.S. PATENT DOCUMENTS

| | | | |
|---|---|---|---|
| 4,562,391 | A | 12/1985 | Inoue |
| 4,787,262 | A | 11/1988 | Kozawa et al. |
| 4,973,215 | A | 11/1990 | Karlen et al. |
| 5,016,489 | A | 5/1991 | Yoda |
| 5,155,423 | A | 10/1992 | Karlen et al. |
| 5,428,713 | A | 6/1995 | Matsumaru |
| 5,577,414 | A | 11/1996 | Ogawa et al. |
| 6,189,403 | B1 | 2/2001 | Berninger |
| 6,243,621 | B1 | 6/2001 | Tao et al. |
| 6,250,174 | B1 | 6/2001 | Terada et al. |
| 6,288,512 | B1 | 9/2001 | Berninger et al. |
| 7,646,161 | B2 | 1/2010 | Albu-Schaffer et al. |
| 8,631,720 | B2 | 1/2014 | Nakagiri et al. |
| D704,757 | S | 5/2014 | Nagai et al. |
| D707,277 | S | 6/2014 | Olsson et al. |
| D713,436 | S | 9/2014 | Liu |
| 9,481,095 | B2 | 11/2016 | Takahashi et al. |
| 9,643,277 | B2 | 5/2017 | Terada et al. |
| 2002/0135334 | A1 | 9/2002 | Uematsu et al. |
| 2009/0114052 | A1 | 5/2009 | Haniya et al. |
| 2009/0249915 | A1 | 10/2009 | Iwai et al. |
| 2009/0266194 | A1 | 10/2009 | Zhang et al. |
| 2010/0162845 | A1 | 7/2010 | Yonehara et al. |
| 2010/0313694 | A1 | 12/2010 | Aoki |
| 2011/0023651 | A1 | 2/2011 | Cooper |
| 2011/0064554 | A1 | 3/2011 | Ito et al. |
| 2011/0118872 | A1 | 5/2011 | Ortmaier et al. |
| 2011/0126661 | A1 | 6/2011 | Long |
| 2012/0067157 | A1 | 3/2012 | Suzuki et al. |
| 2012/0111135 | A1 | 5/2012 | Ichibangase et al. |
| 2012/0130541 | A1 | 5/2012 | Szalek |
| 2012/0272774 | A1 | 11/2012 | Kirihara et al. |
| 2013/0025399 | A1 | 1/2013 | Sakaki et al. |
| 2013/0055842 | A1 | 3/2013 | Okada |
| 2013/0168505 | A1 | 7/2013 | Ljungkvist |
| 2013/0255428 | A1 | 10/2013 | Hahakura et al. |
| 2013/0255429 | A1 | 10/2013 | Hahakura et al. |
| 2013/0333509 | A1 | 12/2013 | Adachi |
| 2014/0013893 | A1 | 1/2014 | Asano et al. |
| 2014/0102240 | A1 | 4/2014 | Inada et al. |
| 2014/0135988 | A1 | 5/2014 | Yanagihara |
| 2014/0137686 | A1 | 5/2014 | Nogami et al. |
| 2014/0238174 | A1 | 8/2014 | Ikebe |
| 2014/0276953 | A1 | 9/2014 | Swamp et al. |
| 2014/0309776 | A1 | 10/2014 | Asada et al. |
| 2014/0309777 | A1 | 10/2014 | Niu |
| 2014/0309778 | A1 | 10/2014 | Asada |
| 2015/0013491 | A1 | 1/2015 | Mori |
| 2015/0027261 | A1 | 1/2015 | Okahisa et al. |
| 2015/0076131 | A1 | 3/2015 | Terada et al. |
| 2015/0096401 | A1 | 4/2015 | Nagai et al. |
| 2015/0266185 | A1 | 9/2015 | Sekine |
| 2015/0283709 | A1 | 10/2015 | Dalakian |
| 2016/0008905 | A1 | 1/2016 | Izawa et al. |
| 2016/0023358 | A1 | 1/2016 | Saito et al. |
| 2016/0023360 | A1 | 1/2016 | Saito et al. |
| 2016/0089777 | A1 | 3/2016 | Komatsu et al. |
| 2016/0089778 | A1 | 3/2016 | Yokota et al. |
| 2016/0089794 | A1 | 3/2016 | Niu et al. |
| 2016/0089796 | A1 | 3/2016 | Owa |
| 2016/0089797 | A1 | 3/2016 | Kavvase et al. |
| 2016/0114480 | A1 | 4/2016 | Krumbacher et al. |
| 2016/0114492 | A1 | 4/2016 | Arakawa et al. |
| 2016/0288335 | A1 | 10/2016 | Akaha et al. |

FOREIGN PATENT DOCUMENTS

| | | |
|---|---|---|
| EP | 2450158 | 5/2012 |
| EP | 26846540 | 1/2014 |
| JP | 05-245784 | 9/1993 |
| JP | 06-047689 | 2/1994 |
| JP | 06-042090 U | 6/1994 |
| JP | 10-175188 | 6/1998 |
| JP | 5145901 B2 | 6/2009 |
| WO | WO 2009/069389 | 6/2009 |
| WO | WO 2009/125648 | 10/2009 |

OTHER PUBLICATIONS

Japanese Office Action for corresponding JP Application No. 2015-040613, dated Apr. 5, 2016.

Extended European Search Report for corresponding EP Application No. 16158158.2-1712, dated Aug. 3, 2016.

Chinese Office Action for corresponding CN Application No. 201510462858.4, dated Apr. 27, 2017 (w/ English machine translation).

Office Action with Form PTO-892 Notice of References Cited issued by the U.S. Patent and Trademark Office for the U.S. Appl. No. 15/052,884, dated Feb. 16, 2017.

Office Action with Form PTO-892 Notice of References Cited issued by the U.S. Patent and Trademark Office for the U.S. Appl. No. 15/052,884, dated Jun. 14, 2017.

Advisory Action issued by the U.S. Patent and Trademark Office for the parent U.S. Appl. No. 15/052,884, dated Aug. 24, 2017.

Office Action with Form PTO-892 Notice of References Cited issued by the U.S. Patent and Trademark Office for the U.S. Appl. No. 15/052,884, dated Sep. 28, 2017.

Notice of Allowance issued by the U.S. Patent and Trademark Office for the parent U.S. Appl. No. 15/052,884, dated Jan. 23, 2018.

ROBOT

CROSS-REFERENCE TO RELATED APPLICATIONS

The present application is a continuation application of the U.S. patent application Ser. No. 15/052,884 filed Feb. 25, 2016, which claims priority under 35 U.S.C. § 119 to Japanese Patent Application No. 2015-040613, filed Mar. 2, 2015. The contents of these applications are incorporated herein by reference in their entirety.

BACKGROUND

Field of the Invention

The embodiments disclosed herein relate to a robot.

Discussion of the Background

Japanese Patent No. 5145901 discloses a seven-joint robot that includes a turnable portion, a lower arm, an elbow, an upper arm, and a wrist. The turnable portion is supported on a base. The lower arm, the elbow, the upper arm, and the wrist are coupled to the turnable portion. The wrist has a three-axis configuration.

SUMMARY

According to one aspect of the present disclosure, a robot includes a first arm rotatable around a first axis, a second arm connected to the first arm at a second axis which is parallel to the first axis and around which the second arm is rotatable, a third arm connected to the second arm at a third axis which is parallel to the first axis and around which the third arm is rotatable, a distal-end swingable portion rotatably connected to the third arm, a distal end rotatably connected to the distal-end swingable portion, a first actuator configured to rotate the first arm about the first axis, a second actuator configured to rotate the second arm about the second axis, a third actuator configured to rotate the third arm about the third axis, a fourth actuator configured to rotate the distal-end swingable portion and including a first motor having a first motor rotation axis, and a fifth actuator configured to rotate the distal end and including a second motor having a second motor rotation axis that is parallel to the first motor rotation axis.

According to another aspect of the present disclosure, a robot includes a first arm rotatable around a first axis and having a first side and a second side opposite to the first side in an axis direction along the first axis, a second arm having the first side and the second side and connected to the first arm at a second axis which is parallel to the first axis and around which the second arm is rotatable, a third arm connected to the second arm at a third axis which is parallel to the first axis and around which the third arm is rotatable, a first actuator provided on the first side and configured to rotate the first arm about the first axis, a second actuator provided on the first side and configured to rotate the second arm about the second axis, a third actuator configured to rotate the third arm about the third axis, and a cable provided on the second side.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Robot System

Figure 1:
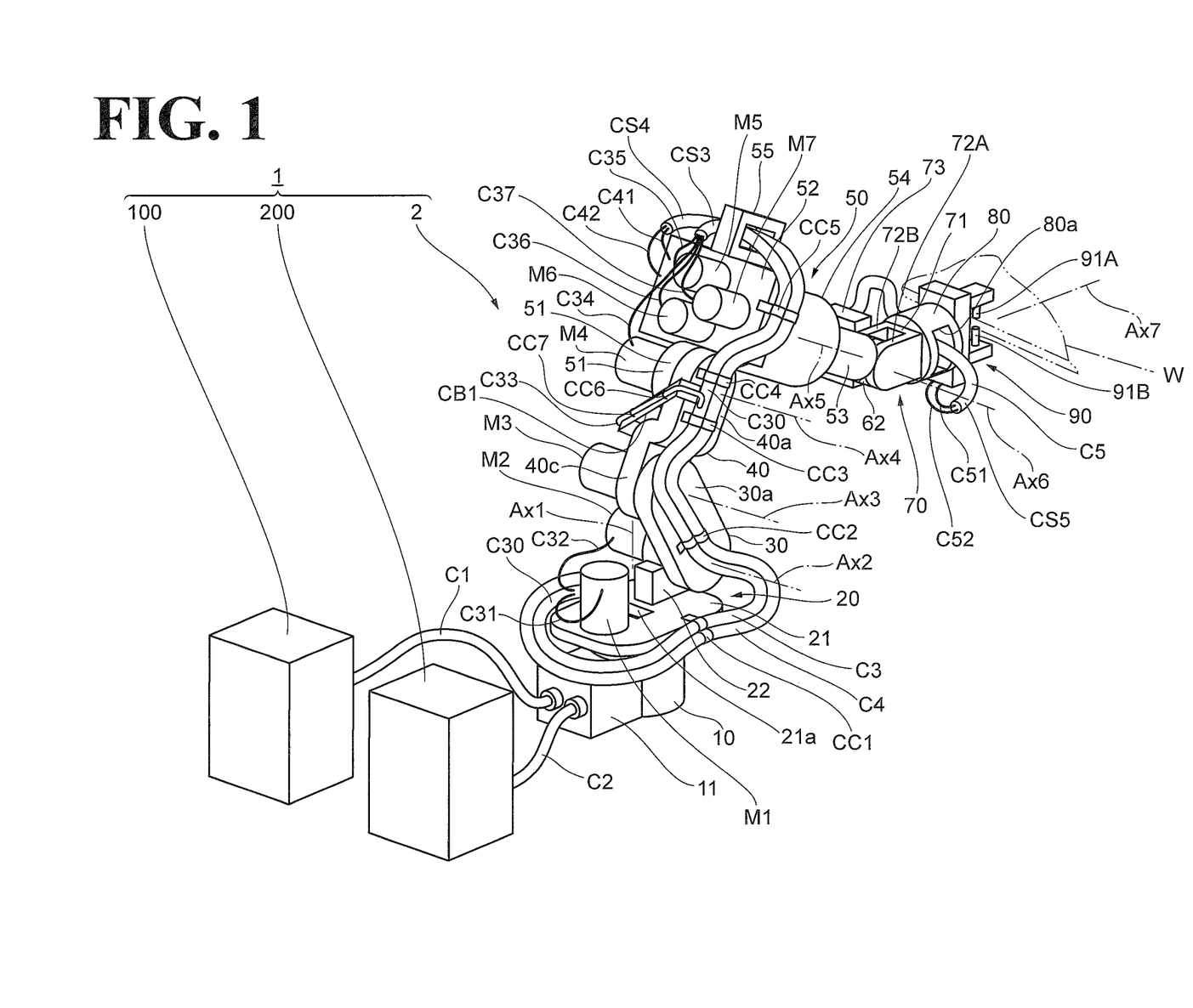
FIG. 1 is a perspective view of a robot system.
Figure 2:
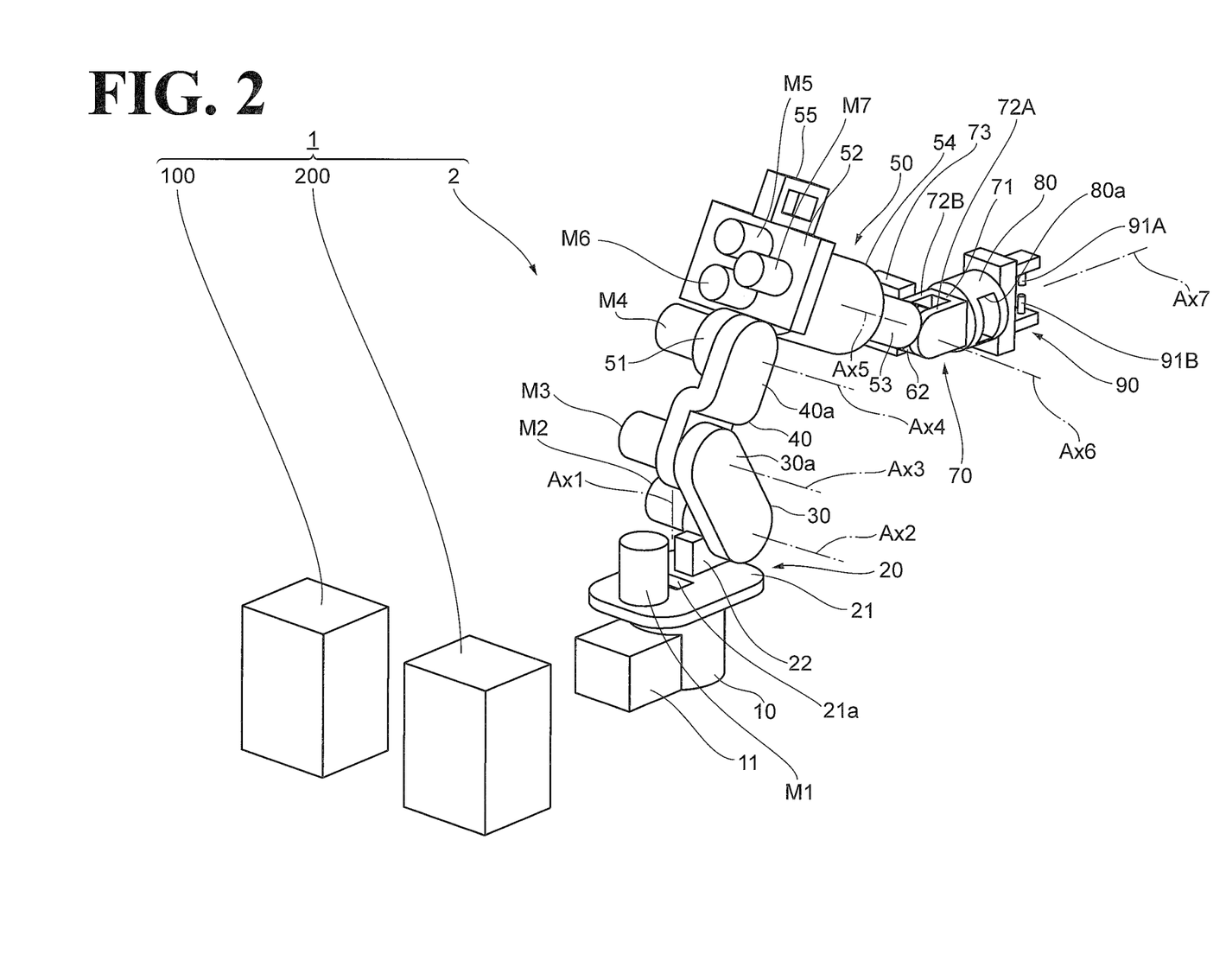
FIG. 2 is a perspective view of the robot system illustrated in FIG. 1 with cables omitted.
Figure 3:
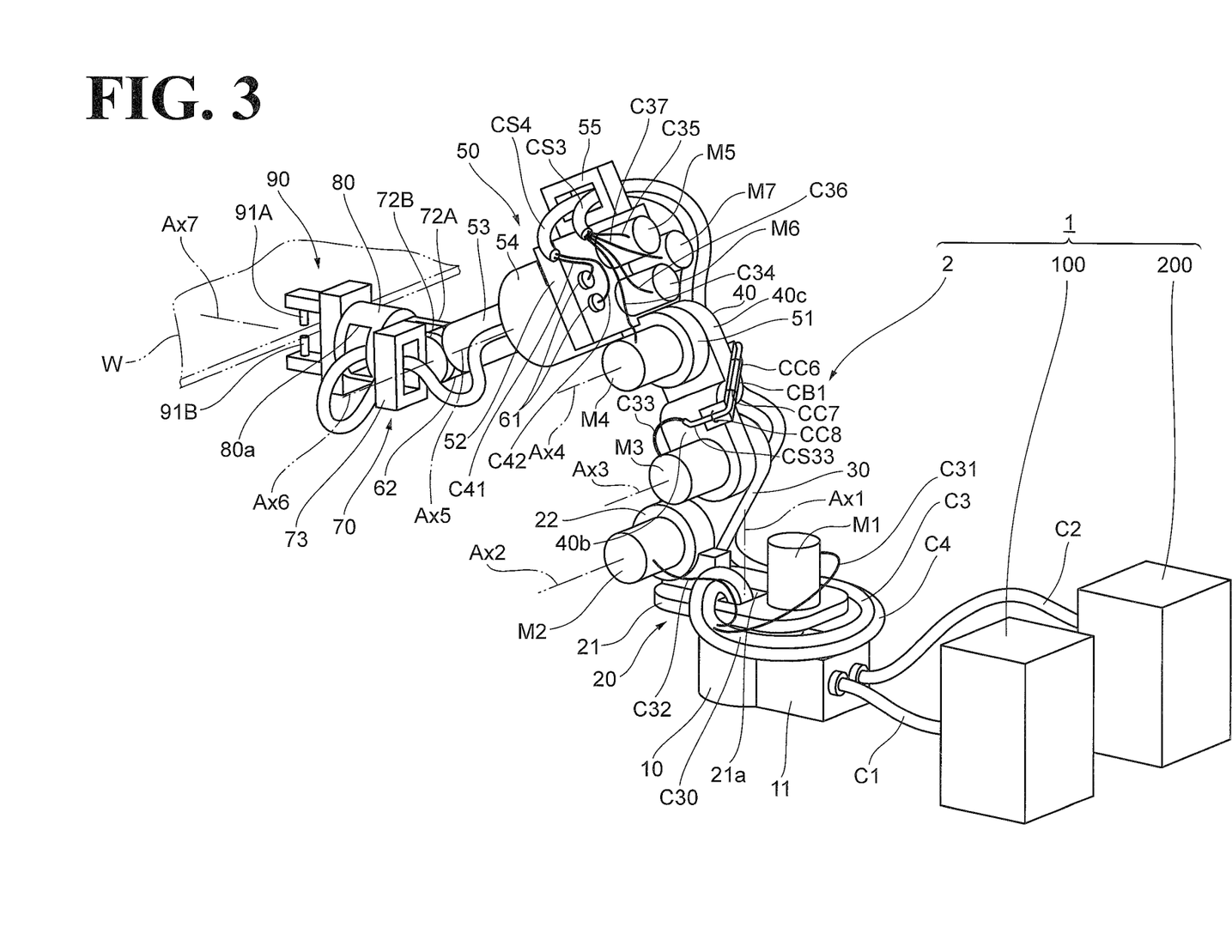
FIG. 3 is another perspective view of the robot system, seen from another direction.

As illustrated in FIGS. 1 to 3, a robot system 1 includes a robot 2, a robot controller 100, a welding controller 200, and cables C1 and C2. The robot 2 is a multi-articular robot and includes a welder 90 at a distal end 80 of the robot 2. The robot controller 100 controls the robot 2 to place the welder 90 at a to-be-welded portion of a workpiece W. The welding controller 200 controls the welder 90 upon placement of the welder 90 at the to-be-welded portion. The robot controller 100 is coupled to the robot 2 through the cable C1, and the welding controller 200 is coupled to the robot 2 through the cable C2.

Robot

As illustrated in FIGS. 1 to 4, the robot 2 includes a base 10, a turnable portion 20, a first arm 30, a second arm 40, a third arm 50, a distal-end swingable portion 70, a distal end 80, the welder 90, actuators M1 to M7, and cables C3 to C5.

The base 10 is disposed in the vicinity of the position where the workpiece W, which is subjected to work, is placed (the position of the workpiece W). The base 10 is fixed to a floor surface. The base 10 includes a terminal 11 to accept the cables C1 and C2. The terminal 11 is disposed on the rear surface of the base 10 (which is opposite to the position of the workpiece W).

The turnable portion 20 is disposed on the base 10 and turnable about a vertical axis line Ax1. The turnable portion 20 includes a base plate 21 and a connection portion 22. The base plate 21 is mounted on top of the base 10 and turnable about the axis line Ax1. The base plate 21 has a form of a horizontal plate with an opening 21a at a center portion for wiring use. The connection portion 22 is disposed at a position displaced from the axis line Ax1 and protrudes perpendicularly from the upper surface of the base plate 21. In the following description, the terms "front", "rear", "left", and "right" will refer to directions that are based on the axis line Ax1 and that are under the assumption that the connection portion 22 is on the front side.

The connection portion 22 is coupled to the base end of the first arm 30. The first arm 30 is swingable about a horizontal axis line Ax2 (first axis line). The axis line Ax2 passes through the connection portion 22. The base end of the first arm 30 is mounted on one side of the connection portion 22 in a direction along the axis line Ax2, and is turnable about the axis line Ax2. In FIGS. 1 to 4, the one side in the direction along the axis line Ax2 corresponds to the right side of the robot 2, and the other side in the direction along the axis line Ax2 corresponds to the left side of the robot 2. While the arrangement of the connection portion 22 and the first arm 30 will not be limited to the arrangement illustrated in FIGS. 1 to 4, the following description will be based on the arrangement illustrated in FIGS. 1 to 4, that is, the one side corresponds to the right side of the robot 2 and the other side corresponds to the left side of the robot 2.

The distal end of the first arm 30 is coupled to the base end of the second arm 40. The second arm 40 is swingable about an axis line Ax3 (second axis line). The axis line Ax3 is parallel to the axis line Ax2. In a non-limiting embodiment, the base end of the second arm 40 is mounted on the left side of the distal end of the first arm 30, and is turnable about the axis line Ax3.

The second arm 40 has a crank shape that is bent at the portion where the first arm 30 and the second arm 40 are coupled to each other so as to circumvent the first arm 30. Specifically, the second arm 40 is bent at its base end to the left side relative to the distal end of the second arm 40, with the base end superposed on the left side of the first arm 30. In other words, the second arm 40 is bent at its distal end to the right side relative to the base end of the second arm 40. This configuration eliminates or minimizes the difference in level between the right side surface, 30a, of the first arm 30 and the right side surface, 40a, of the second arm 40. In a non-limiting embodiment, the right side surfaces 30a and 40a are flush with each other.

The distal end of the second arm 40 is coupled to the base end of the third arm 50. The third arm 50 is swingable about an axis line Ax4 (third axis line). The axis line Ax4 is parallel to the axis line Ax3. In a non-limiting embodiment, the third arm 50 includes a connection portion 51, a base plate 52, a turnable link 53, a cover 54, and a cable guide 55. The connection portion 51 serves as the base end of the third arm 50. The connection portion 51 is mounted on the left side of the distal end of the second arm 40 and turnable about the axis line Ax4.

The base plate 52 abuts on the connection portion 51 and has a plate shape with a longitudinal length along the axis line Ax4.

The turnable link 53 is mounted on one surface of the base plate 52 and turnable about an axis line Ax5. The axis line Ax5 is orthogonal to the axis line Ax4. The axis line Ax5 is orthogonal to the base plate 52, and the turnable link 53 has a longitudinal shape centered around the axis line Ax5. At the distal end of the turnable link 53, a connection portion 62 is disposed along the axis line Ax5.

At a left side portion of the base plate 52, a plurality of junction connectors 61 are disposed. The plurality of junction connectors 61 are used for wiring for the welder 90, described later.

Figure 4:
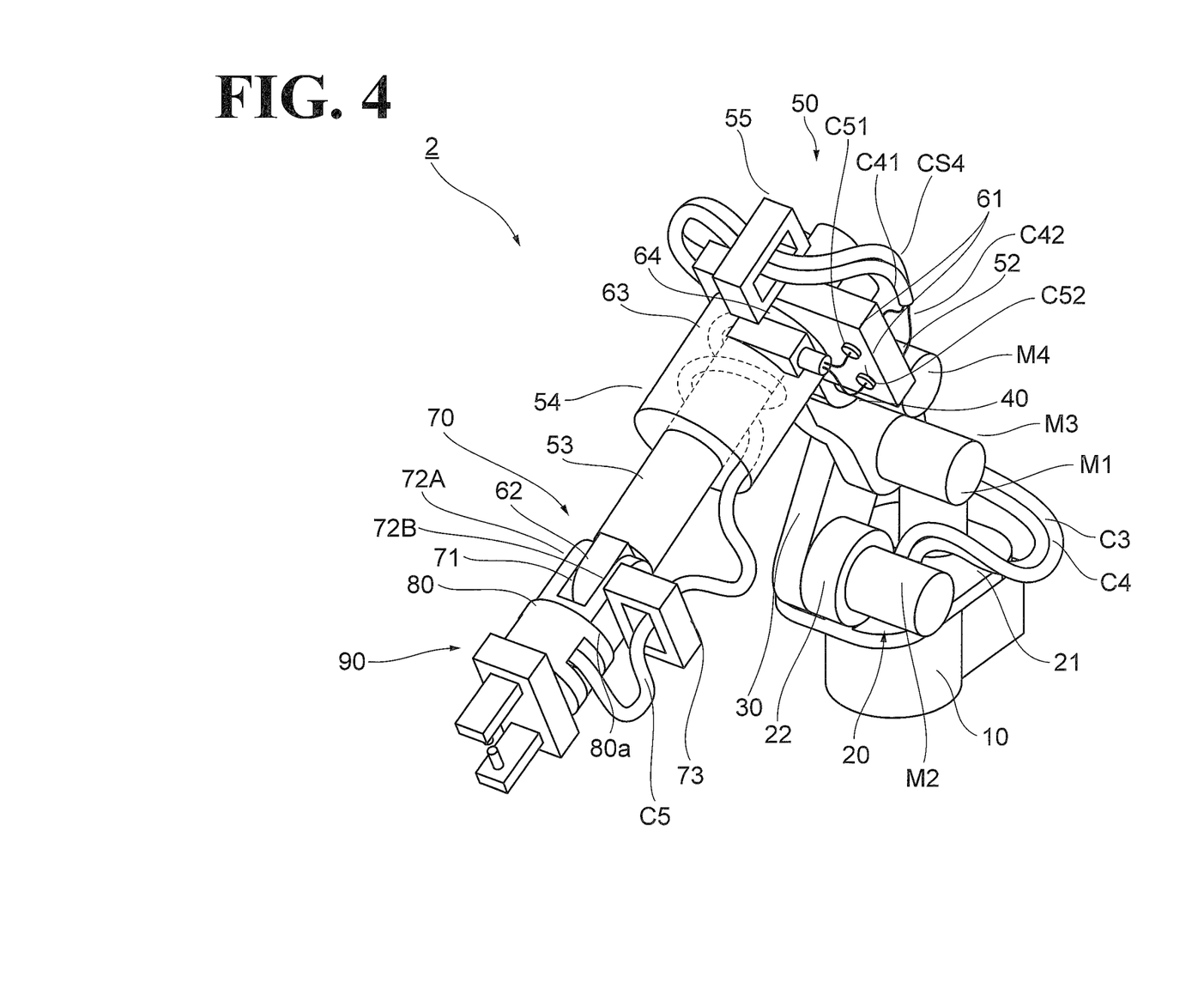
FIG. 4 is still another perspective view of the robot system, seen from still another direction.

The cover 54 includes a surrounding wall 63 and an introduction portion 64 (see FIG. 4). The surrounding wall 63 has a hollow cylindrical shape that surrounds the turnable link 53. In a non-limiting embodiment, the surrounding wall 63 is mounted on the base plate 52 and accommodates a part of the cable C5. The introduction portion 64 is disposed on the outer circumference of the surrounding wall 63 at its base end (the base plate 52 side), and opens to one side (for example, left side) of the turnable link 53.

The cable guide 55 is disposed on one side of outer circumference of the base plate 52 opposite to the side on which the connection portion 51 is disposed. The cable guide 55 is fixed to the base plate 52. The cable guide 55 has a ring shape surrounding a line that is along the axis line Ax4 to allow the cables C3 and C4, described later, to pass through the cable guide 55.

The connection portion 62 of the turnable link 53 is coupled to the base end of the distal-end swingable portion 70. The distal-end swingable portion 70 is swingable about an axis line Ax6. The axis line Ax6 is orthogonal to the axis line Ax5. The distal-end swingable portion 70 includes a base plate 71, connection portions 72A and 72B, and a cable guide 73.

The base plate 71 serves as the distal end of the distal-end swingable portion 70. The connection portions 72A and 72B are disposed on edges of the base plate 71 and protrude perpendicularly from one surface of the base plate 71 to serve as the base end of the distal-end swingable portion 70. The connection portions 72A and 72B are opposed to each other across a center portion of the base plate 71. The connection portions 72A and 72B hold the connection portion 62 between the connection portions 72A and 72B in a direction along the axis line Ax6, are mounted on the connection portion 62, and are turnable about the axis line Ax6.

The cable guide 73 is fixed to the outer surface of any of the connection portions 72A and 72B (a surface opposite to the side on which the connection portion 62 is disposed). The cable guide 73 has a ring shape surrounding a line perpendicular to the base plate 71, and allows the cable C5, described later, to pass through the cable guide 73.

The base plate 71 is coupled to the distal end 80. The distal end 80 is mounted on the other surface of the base plate 71 opposite to the surface on which the connection portions 72A and 72B are mounted. The distal end 80 is turnable about an axis line Ax7. The axis line Ax7 is orthogonal to the axis line Ax6. The axis line Ax7 is also orthogonal to the base plate 71, and the distal end 80 has a solid cylindrical shape centered around the axis line Ax7. The distal end 80 has a guide hole 80a. The guide hole 80a penetrates through the distal end 80 in a direction orthogonal to the axis line Ax7. The guide hole 80a allows the cable C5, described later, to pass through the guide hole 80a.

A non-limiting example of the welder 90 is a spot welding gun that includes electrodes 91A and 91B. The electrodes 91A and 91B are opposed to each other. The welder 90 is mounted on the distal end 80. In a non-limiting embodiment, the welder 90 is detachably mounted on one side of the distal end 80 opposite to the side on which the distal-end swingable portion 70 is disposed. It is noted that the detachability of the welder 90 relative to the distal end 80 is not essential. Another possible embodiment is that the welder 90 is integral to the distal end 80.

In the embodiment described hereinbefore, the first arm 30, the second arm 40, the third arm 50, and the distal end 80 of the robot 2 are coupled in series to each other. As used herein, the term "coupled" encompasses a connection by way of some other member (for example, the distal-end swingable portion 70).

In this embodiment, the actuators M1 to M7 are each made up of a motor, a reducer, and a brake.

The actuator M1 is fixed to the base plate 21 of the turnable portion 20, and causes the turnable portion 20 to turn about the axis line Ax1 in response to supply of electric power. The fixation of the actuator means fixation of the body of the actuator (which is the portion to which the energy supply cable is coupled). This applies to the following description.

The actuator M2 (first actuator) causes the first arm 30 to swing about the axis line Ax2 in response to supply of electric power. The actuator M3 (second actuator) causes the second arm 40 to swing about the axis line Ax3 in response to supply of electric power. The actuators M2 and M3 are disposed on the same side in the direction along the axis line Ax2. In a non-limiting embodiment, the actuator M2 is disposed on the left side of the connection portion 22 and fixed to the connection portion 22. The actuator M3 is disposed on the left side of the base end of the second arm 40 and fixed to the second arm 40.

The actuator M4 (third actuator) causes the third arm 50 to swing about the axis line Ax4 in response to supply of electric power. The actuator M4 is disposed on the side on which the actuators M2 and M3 are disposed in the direction along the axis line Ax2. In a non-limiting embodiment, the actuator M4 is disposed on the left side of the connection portion 51 and fixed to the connection portion 51.

The actuators M5 to M7 are fixed to the other surface of the base plate 52 opposite to the one surface on which the turnable link 53 is mounted. The actuator M5 causes the turnable link 53 to turn about the axis line Ax5 in response to supply of electric power. The actuator M6 causes the distal-end swingable portion 70 to swing about the axis line Ax6 in response to supply of electric power. The actuator M6 transfers motive power to the distal-end swingable portion 70 through a transfer mechanism made up of a drive shaft, gears, and other elements. The transfer mechanism is built in the turnable link 53. The actuator M7 causes the distal end 80 to turn about the axis line Ax1 in response to supply of electric power. The actuator M7 transfers motive power to the distal end 80 through a transfer mechanism made up of a drive shaft, gears, and other elements. The transfer mechanism is built in the turnable link 53 and the distal-end swingable portion 70.

The actuators M5 to M7 cooperate with each other to freely adjust the posture of the distal end 80. That is, the actuators M5 to M7 are examples of the plurality of posture adjustment actuators to adjust the posture of the distal end 80.

The cable C3 (first cable) is a cable harness made up of a bundle of a plurality of cables C31 to C37 covered with a sheath C53. In this embodiment, the plurality of cables C31 to C37 are each made up of a plurality of power supply lines and a plurality of signal lines.

The cable C31 transfers energy (for example, drive power and electrical signals) between the robot controller 100 and the actuator M1. The cable C32 transfers energy (for example, drive power and electrical signals) between the robot controller 100 and the actuator M2. The cable C33 transfers energy (for example, drive power and electrical signals) between the robot controller 100 and the actuator M3. The cable C34 transfers energy (for example, drive power and electrical signals) between the robot controller 100 and the actuator M4. The cable C35 transfers energy (for example, drive power and electrical signals) between the robot controller 100 and the actuator M5. The cable C36 transfers energy (for example, drive power and electrical signals) between the robot controller 100 and the actuator M6. The cable C37 transfers energy (for example, drive power and electrical signals) between the robot controller 100 and the actuator M7.

One end of the cable C3 is coupled to the cable C1 through the terminal 11. The cable C3 is disposed on the side opposite to the side on which the actuators M2 and M3 are disposed in the direction along the axis line Ax2. In a non-limiting embodiment, the cable C3 is extended out through the opening 21a onto the base plate 21 and is wired on the rear side of the base plate 21 and then on the right side the first arm 30 and the second arm 40. Then, the cable C3 is wired through the cable guide 55 to the left side of the third arm 50. That is, in the wiring path between the first arm 30 and the second arm 40, the cable C3 is wired on the side opposite to the side on which the actuators M2 and M3 are disposed.

The cable C3 is fixed to a right side portion of the base plate 21 with a cable clamp CC1, is fixed to the right side surface 30a of the first arm 30 with a cable clamp CC2, is fixed to the right side surface 40a of the second arm 40 with cable clamps CC3 and CC4, and is fixed to a right side portion of the base plate 52 with a cable clamp CC5. In a non-limiting embodiment, the cable clamps CC1 to CC5 are made of metal. With the cable C3 held in the cable clamps CC1 to CC5, each cable clamp is fixed to a portion of the robot 2 with a bolt or a similar element. The cable clamps CC3 and CC4 are aligned in the longitudinal direction of the second arm 40 (that is, in the direction from the base end to the distal end of the second arm 40).

The cables C31 and C32 (which are branch lines) are branched from the other cables C33, C34, C35, C36, and C37 (main line C30) between the opening 21a and the cable clamp CC1, and are respectively coupled to the actuators M1 and M2.

The cable C33 (branch line) is branched from the other cables C34, C35, C36, and C37 (main line C30) between cable clamps CC33 and CC34, and is coupled to the actuator M3. The cable C33 branched from the main line C30 is wired on the rear surface 40c of the second arm 40 (which is the side opposite to the position of the workpiece W) to the left side surface 40b of the second arm 40.

The cable C33 branched from the main line C30 is wired along a guide member CB1 to the actuator M3. A non-limiting example of the guide member CB1 is a metal bracket. The guide member CB1 extends to the right and to the left at a position opposed to the rear surface 40c. The guide member CB1 is bent forward at its right end and fixed to the right side surface 40a. The guide member CB1 is bent forward at its left end and fixed to the left side surface 40b. The cable C33 is covered with the sheath CS33 at least over the portion along the guide member CB1. The portion of the cable C33 along the guide member CB1 is fixed to the guide member CB1 with cable clamps CC6 to CC8. A non-limiting example of each of the cable clamps CC6 to CC8 is a resin binding band, and each cable clamp is placed over the sheath CS33 to bind the cable C33 to the guide member CB1. The cable clamps CC6 to CC8 are aligned along the guide member CB1, and at least one cable clamp among the cable clamps CC6 to CC8 (for example, cable clamp CC8) is disposed at the left end of the guide member CB1.

Since the cable C33 is guided along the guide member CB1, the cable C33 is prevented from becoming loose toward outside. This stabilizes the wiring path between the main line C30 and the actuator M3. Since at least one cable clamp among the cable clamps CC6 to CC8 is disposed at the left end of the guide member CB1, the cable C33 wired to the actuator M3 is guided along the left side surface 40b. Thus, the wiring path to the actuator M3 is kept to the left side surface 40b. This configuration further prevents outward looseness of the cable 33.

The cable C3 now wired to the left side of the third arm 50 through the cable guide 55 separates into the cables C34, C35, C36, and C37. The cables C34, C35, C36, and C37 are respectively coupled to the actuators M4, M5, M6, and M7.

The cable C4 (second cable) is a cable harness made up of a bundle of a plurality of cables C41 and C42 covered with a sheath C54. In this embodiment, the cables C41 and C42 are electric wires to transfer energy (for example, welding power) from the welding controller 200. This, however, should not be construed in a limiting sense.

Another possible embodiment is that the cables C41 and C42 are hoses to transfer a fluid for cooling purposes.

One end of the cable C4 is coupled to the cable C2 through the terminal 11. Similarly to the cable C3, the cable C4 is wired on the side opposite to the side on which the actuators M2 and M3 are disposed in the direction along the axis line Ax2. In a non-limiting embodiment, together with the cable 3, the cable C4 is extended out through the opening 21a onto the base plate 21 and is wired on the rear side of the base plate 21 and then on the right side the first arm 30 and the second arm 40. Then, the cable C3 is wired through the cable guide 55 to the left side of the third arm 50. That is, in the wiring path between the first arm 30 and the second arm 40, the cable C4 is wired on the side opposite to the side on which the actuators M2 and M3 are disposed.

Together with the cable C3, the cable C4 is fixed to the right side portion of the base plate 21 with the cable clamp CC1, is fixed to the right side surface 30a of the first arm 30 with the cable clamp CC2, is fixed to the right side surface 40a of the second arm 40 with the cable clamps CC3 and CC4, and is fixed to the right side portion of the base plate 52 with the cable clamp CC5.

The cable C4 now wired to the left side of the third arm 50 through the cable guide 55 separates into the cables C41 and C42. The cables C41 and C42 are respectively coupled to the plurality of junction connectors 61 on the side opposite to the side on which the turnable link 53 is disposed.

The cable C5 (second cable) is a cable harness made up of a bundle of a plurality of cables C51 and C52 covered with a sheath CS5. In this embodiment, the cables C51 and C52 are similar in kind to the cables C41 and C42. The cable C51 couples one end of the cable C41, which is coupled to one junction connector 61, to the welder 90. The cable C52 couples one end of the cable C42, which is coupled to the other junction connector 61, to the welder 90.

At one end of the cable C5, the cables C51 and C52 are respectively coupled to the junction connectors 61 on the side of the turnable link 53. Thus, the cables C51 and C52 are respectively coupled to the cables C41 and C42 through the junction connectors 61.

The cable C5 is wired through the introduction portion 64, the surrounding wall 63, the cable guide 73, and the guide hole 80a to the vicinity of the welder 90. From the surrounding wall 63 on, the cable C5 is wired on the outer surface of the turnable link 53 with enough allowance (looseness) to follow the turning of the turnable link 53. The cable C5 through the guide hole 80a separates into the cables C51 and C52. The cables C51 and C52 are coupled to the welder 90.

Advantageous Effects of the Embodiment

As has been described hereinbefore, the robot 2 includes the first arm 30, the second arm 40, the third arm 50, the distal end 80, the actuator M2, the actuator M3, the actuator M4, and the plurality of the actuators M5 to M7. The first arm 30, the second arm 40, the third arm 50, and the distal end 80 are coupled in series to each other. The actuator M2 swings the first arm 30 about the axis line Ax2. The actuator M3 swings the second arm 40 about the axis line Ax3, which is parallel to the axis line Ax2. The actuator M4 swings the third arm 50 about the axis line Ax4, which is parallel to the axis line Ax2. The plurality of the actuators M5 to M7 adjust the posture of the distal end 80. The actuators M2 and M3 are disposed on the same side in the direction along the axis line Ax2.

Figure 5:
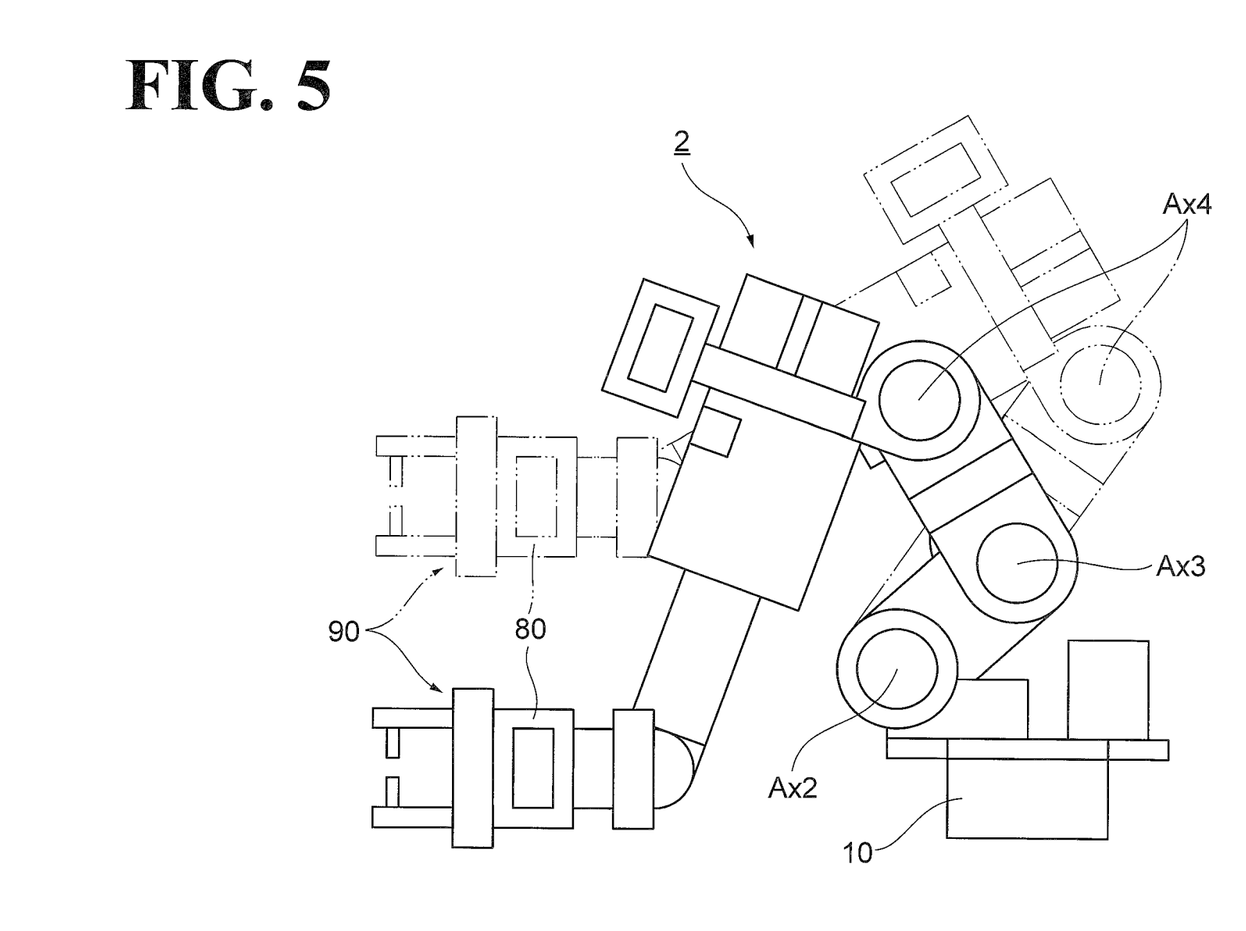
FIG. 5 illustrates a movable range of a robot.

Since the robot 2 includes the second arm 40 in addition to the first arm 30 and the third arm 50, the movable range of the welder 90 increases. The double-dashed lines illustrated in FIG. 5 indicate a comparative example in which the second arm 40 is integral to the first arm 30 and unable to swing about the axis line Ax3. In the comparative example, due to the limit that the third arm 50 has in moving about the axis line Ax4, the welder 90 cannot move further downward from where the welder 90 is illustrated by the double-dashed lines. Contrarily, the robot 2 according to the embodiment allows the second arm 40 to turn about the axis line Ax3 and thus enables the welder 90 to move further downward.

Since the axis line Ax3 is parallel to the axis line Ax2, the robot 2 does not tilt to the right or left even though the second arm 40 swings about the axis line Ax3. This configuration ensures diminished gaps between the robot 2 and surrounding machines, apparatuses, and/or devices.

Figure 6:
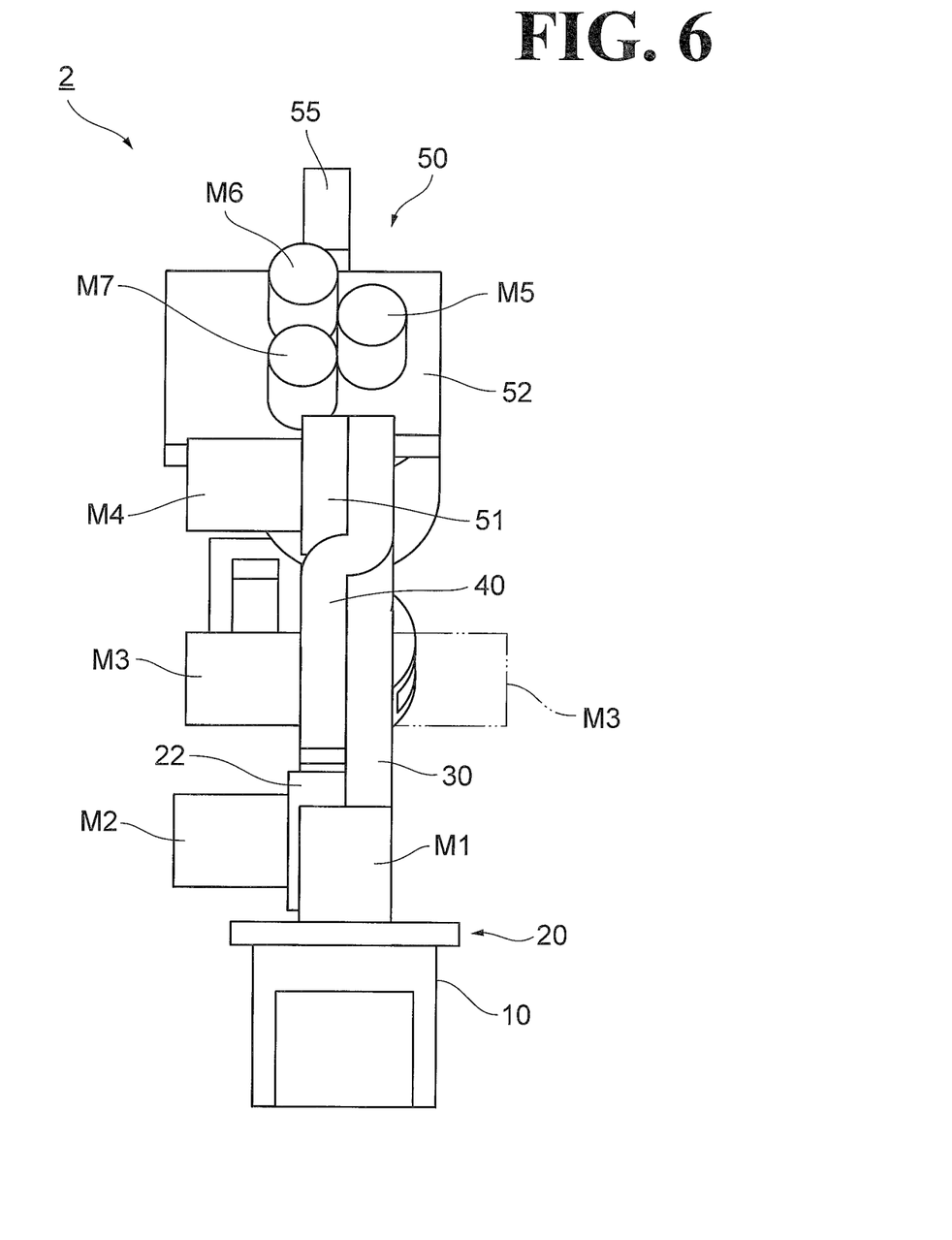
FIG. 6 illustrates a width of the robot.

Since the actuators M2 and M3 are disposed on the same side in the direction along the axis line Ax2, the width of the robot 2 (width in the direction along the axis line Ax2) is decreased at least over the portion between the first arm 30 and the second arm 40. The double-dashed line illustrated in FIG. 6 indicates a comparative example in which the actuator M3 is disposed on the side opposite to the side on which the actuator M2 is disposed in the direction along the axis line Ax2. In the comparative example, the actuators M2 and M3 respectively protrude to the right and the left. This configuration increases the width of the robot 2. Contrarily, in the robot 2 according to the embodiment, the actuators M2 and M3 are disposed on the same side in the direction along the axis line Ax2. This configuration decreases the width of the robot 2 as compared with the comparative example in which the actuators M2 and M3 are disposed on opposite sides. Thus, the configuration of the embodiment ensures diminished gaps between the robot 2 and surrounding machines, apparatuses, and/or devices.

The actuator M4 is disposed on the side on which the actuators M2 and M3 are disposed in the direction along the axis line Ax2. This configuration decreases the width of the robot 2 at least over the portion between the first arm 30 and the third arm 50. This further diminishes gaps between the robot 2 and surrounding machines, apparatuses, and/or devices.

The robot 2 further includes the cable C3. The cable C3 is wired on the side opposite to the side on which the actuators M2 and M3 are disposed in the direction along the axis line Ax2 so as to transfer energy to the actuators M3 to M7. This configuration eliminates or minimizes the need for meandering of the cable C3 in an attempt to circumvent the actuators M2 and M3, and thus facilitates the wiring of the cable C3. Eliminating or minimizing the meandering of the cable C3 also eliminates or minimizes interference between the cable C3 and surrounding machines, apparatuses, and/or devices. This further diminishes gaps between the robot 2 and the surrounding machines, apparatuses, and/or devices.

The cable C3 includes the main line C30 and the cable C33 (branch line). The main line C30 is wired on the side opposite to the side on which the actuators M2 and M3 are disposed in the direction along the axis line Ax2. The cable C33 is branched from the main line C30 and wired to the actuator M3. This configuration ensures that even if the connection terminal of the actuator M3 is located on the side opposite to the side of the main line C30, the cable C33 is wired to the connection terminal without meandering of the main line C30. This further facilitates the wiring of the cable C3.

The robot 2 further includes two cable clamps CC3 and CC4. The cable clamps CC3 and CC4 hold the cable C3 and are disposed on the first arm 30 or the second arm 40 to which the actuator M3 is fixed. The cable C33 is branched from the main line C30 between the two cable clamps CC3 and CC4. In this configuration, the actuator M3 and the branching position of the cable C33 branched from the main line C30 are fixed to the same arm. This enhances the durability of the branching position of the cable C33.

In this embodiment, the actuator M3 and the cable clamps CC3 and CC4 are fixed to the second arm 40. This, however, should not be construed in a limiting sense. Another possible embodiment is that the actuator M3 and the cable clamps CC3 and CC4 are fixed to the first arm 30.

The first aim 30 is coupled to the base 10, which is disposed in the vicinity of the position of the workpiece W. The cable C33 is wired on the side opposite to the position of the workpiece W. This configuration eliminates or minimizes interference between the elements of the robot 2 and the cable C33 at the time when the distal end 80 of the robot 2 is arranged at the workpiece W. This further enhances the durability of the branching position of the cable C33.

One arm among the first arm 30 and the second arm 40 has a crank shape that is bent at the portion where the first arm 30 and the second arm 40 are coupled to each other so as to circumvent the other arm. The actuator M3 is fixed to the one arm. The configuration in which one arm is bent in the form of a crank eliminates or minimizes the difference in level between the side surface (right side surface 30a) of the first arm 30 and the side surface (right side surface 40a) of the second arm 40 on the side opposite to the side on which the actuators M2 and M3 are disposed. This makes the cable C3 more readily arranged along the first arm 30 and the second arm 40, and thus further facilitates the wiring of the first cable.

In this embodiment, the right side surface 30a and the right side surface 40a are flush with each other. This configuration makes the cable C3 even more readily arranged along the first arm 30 and the second arm 40, and further facilitates the wiring of the first cable.

In this embodiment, the second arm 40 has a crank shape that is bent at the portion where the first arm 30 and the second arm 40 are coupled to each other so as to circumvent the first arm 30, and the actuator M3 is fixed to the second arm 40. Around the base end of the first arm 30, cables and wires to the elements of the robot 2 are concentrated. In view of this situation, the second arm 40 has a crank shape, and this leads to a simplified shape of the first arm 30, resulting in more room around the base end of the first arm 30. This configuration further facilitates the wiring of the cable C3.

It is noted that the second arm 40 being bent in a crank shape is not essential. Another possible embodiment is that the first arm 30 has a crank shape that is bent at the portion where the first arm 30 and the second arm 40 are coupled to each other so as to circumvent the second arm 40, and that the actuator M3 is fixed to the first arm 30.

The robot 2 further includes the welder 90 and the cables C4 and C5. The welder 90 is disposed on the distal end 80. The cables C4 and C5 are coupled to the welder 90. The cables C4 and C5 are wired on the side opposite to the side on which the actuators M2 and M3 are disposed. This configuration facilitates the wiring of the cables C4 and C5, as well as the wiring of the cable C3. It is noted that the cables C4 and C5, which are coupled to the welder 90, may be more difficult to bend than the cable C3. In this case, the facilitated wiring of the wires and cables would be found more advantageous.

The second cable, which is coupled to the welder 90, separates into the cables C4 and C5 at the junction connectors 61. This configuration ensures that the wiring work of the cable C4 from the base 10 to the base plate 52 and the wiring work of the cable C5 from the base plate 52 to the welder 90 can be performed independently of each other. This further facilitates the wiring of the second cable.

The above-described embodiment should not be construed in a limiting sense. Specifically, while in the above-described embodiment the robot 2 includes three actuators M5 to M7 to adjust the posture of the distal end 80, this should not be construed in a limiting sense. It is possible to conveniently change the arrangement and the number of the actuators M5 to M7 in accordance with postures required of the distal end 80.

The welder 90 at the distal end 80 will not be limited to a spot welding gun. Another possible example is a welding torch for arc welding. In this case, the cable C4 may include a cable to advance a welding material. In another possible embodiment, an end effector other than the welder 90 (for example, a robot hand) is mounted on the distal end 80. In this case, the cable C4 may include a cable to transfer drive energy to the end effector.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot comprising:
    a first arm rotatable around a first axis, the first arm having a first side and a second side opposite to the first side of the first arm in an axis direction along the first axis;
    a second arm connected to the first arm at a second axis which is parallel to the first axis and around which the second arm is rotatable, the second arm having a first side and a second side opposite to the first side of the second arm in an axis direction along the second axis, the first side of the first arm and the first side of the second arm being on a same side of the robot;
    a third arm connected to the second arm at a third axis which is parallel to the first axis and around which the third arm is rotatable;
    a distal-end swingable portion rotatably connected to the third arm;
    a distal end rotatably connected to the distal-end swingable portion;
    a first actuator configured to rotate the first arm about the first axis, the first actuator being provided on the first side of the first arm;
    a second actuator configured to rotate the second arm about the second axis, the second actuator being provided on the first side of the second arm;
    a third actuator configured to rotate the third arm about the third axis;
    a fourth actuator configured to rotate the distal-end swingable portion and including a first motor having a first motor rotation axis;
    a fifth actuator configured to rotate the distal end and including a second motor having a second motor rotation axis that is parallel to the first motor rotation axis; and
    a cable provided on the second side of the first arm and the second side of the second arm, wherein the cable comprises:
a main line disposed on the second side of the first arm and the second side of the second arm; and
a branch line branched from the main line and coupled to the second actuator, and
wherein the main line of the cable that extends along the first arm and the second arm is entirely disposed on the second side of the first arm and the second side of the second arm.

2. The robot according to claim 1, wherein the third arm includes a mount surface that is parallel to the third axis and wherein the fourth actuator and the fifth actuator are provided on the mount surface such that the first motor rotation axis and the second motor rotation axis are perpendicular to the mount surface.

3. The robot according to claim 2, wherein the mount surface includes a first mount part and a second mount part that are parallel to the third axis and wherein the fourth actuator is provided on the first mount part and the fifth actuator is provided on the second mount part such that the first motor rotation axis is perpendicular to the first mount part and the second motor rotation axis is perpendicular to the second mount part.

4. The robot according to claim 1, further comprising:
a tool rotatably connected to the distal end; and
a sixth actuator configured to rotate the tool and including a third motor having a third motor rotation axis that is parallel to the first motor rotation axis.

5. The robot according to claim 4, wherein the third arm includes a mount surface that is parallel to the third axis and wherein the fourth actuator, the fifth actuator, and the sixth actuator are provided on the mount surface such that the first motor rotation axis, the second motor rotation axis, and the third motor rotation axis are perpendicular to the mount surface.

6. The robot according to claim 5, wherein the mount surface includes a first mount part, a second mount part and a third mount part that are parallel to the third axis and wherein the fourth actuator is provided on the first mount part, the fifth actuator is provided on the second mount part, and the sixth actuator is provided on the third mount part such that the first motor rotation axis is perpendicular to the first mount part, the second motor rotation axis is perpendicular to the second mount part, and the third motor rotation axis is perpendicular to the third mount part.

7. The robot according to claim 1, wherein the distal-end swingable portion connected to the third arm rotatably around a fourth axis that is perpendicular to the third axis.

8. The robot according to claim 1, wherein the third actuator is provided on the same side of the robot.

9. The robot according to claim 8, wherein the third arm has a first side and a second side opposite to the first side of the third arm in an axis direction along the third axis, the first side of the third arm being on the same side of the robot, and the cable extends along the second side of the third arm.

10. The robot according to claim 9, wherein the cable is configured to transmit energy to the second actuator and the third actuator.

11. A robot comprising:
a first arm rotatable around a first axis, the first arm having a first side and a second side opposite to the first side of the first arm in an axis direction along the first axis;
a second arm connected to the first arm at a second axis which is parallel to the first axis and around which the second arm is rotatable, the second arm having a first side and a second side opposite to the first side of the second arm in an axis direction along the second axis, the first side of the first arm and the first side of the second arm being on a same side of the robot;
a third arm connected to the second arm at a third axis which is parallel to the first axis and around which the third arm is rotatable;
a first actuator provided on the first side of the first arm and configured to rotate the first arm about the first axis;
a second actuator provided on the first side of the second arm and configured to rotate the second arm about the second axis;
a third actuator configured to rotate the third arm about the third axis; and
a cable provided on the second side of the first arm and the second side of the second arm,
wherein the cable comprises:
a main line disposed on the second side of the first arm and the second side of the second arm; and
a branch line branched from the main line and coupled to the second actuator, and
wherein the main line of the cable that extends along the first arm and the second arm is entirely disposed on the second side of the first arm and the second side of the second arm.

12. The robot according to claim 11, wherein the third actuator is provided on the same side of the robot.

13. The robot according to claim 12, wherein the third arm has a first side and a second side opposite to the first side of the third arm in an axis direction along the third axis, the first side of the third arm being on the same side of the robot, and the cable extends along the second side of the third arm.

14. The robot according to claim 11, wherein the cable is configured to transmit energy to the second actuator and the third actuator.

15. The robot according to claim 11, further comprising:
a first cable clamp provided on the first arm to hold the cable; and
a second cable clamp provided on the second arm to hold the cable.

* * * * *